April 23, 1935.   H. G. STEIN   1,998,945
POWER TRANSMISSION
Filed May 18, 1934   2 Sheets-Sheet 1

Inventor
HAROLD G. STEIN
By
Attorneys

April 23, 1935. H. G. STEIN 1,998,945
POWER TRANSMISSION
Filed May 18, 1934 2 Sheets-Sheet 2

Inventor
HAROLD G. STEIN.
By
Attorneys

Patented Apr. 23, 1935

1,998,945

UNITED STATES PATENT OFFICE 1,998,945

POWER TRANSMISSION

Harold G. Stein, Milwaukee, Wis.

Application May 18, 1934, Serial No. 726,244

1 Claim. (Cl. 74—124)

This invention appertains to a novel device for the transmission of power from a driving member to a driven member and is capable of general application, but is particularly susceptible for use as a variable speed transmission for motor vehicles.

One of the salient objects of my invention is the provision of novel means for automatically governing the speed of the output, or driven, shaft of the transmission in accordance with the speed of the engine, or drive motor, whereby the necessity of providing manual operable members is entirely dispensed with.

Another important object of my invention is the provision of a plurality of driving cams actuated from the motor for driving push members operatively connected with the drive shaft, with means for varying the position of the cams, relative to the push members, for varying the stroke thereof, and consequently the speed of the driven shaft.

A further object of my invention is the provision of an engine-driven governor operatively connected to the cams for automatically shifting the cams relative to the push members, so as to govern the speed of the driven shaft in accordance with the speed of the engine.

A further object of my invention is the provision of novel means for forming the cams and the push members, so that the push members will be progressively actuated for imparting steady movement to the driven shaft, the cams being so generated that the push members will be operated in a uniform manner.

A still further object of my invention is to provide an improved variable speed transmission of the above character, which will be durable and efficient in use, one that will be simple and easy to manufacture, one which will embody a minimum number of operating parts, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:—

Figure 1:
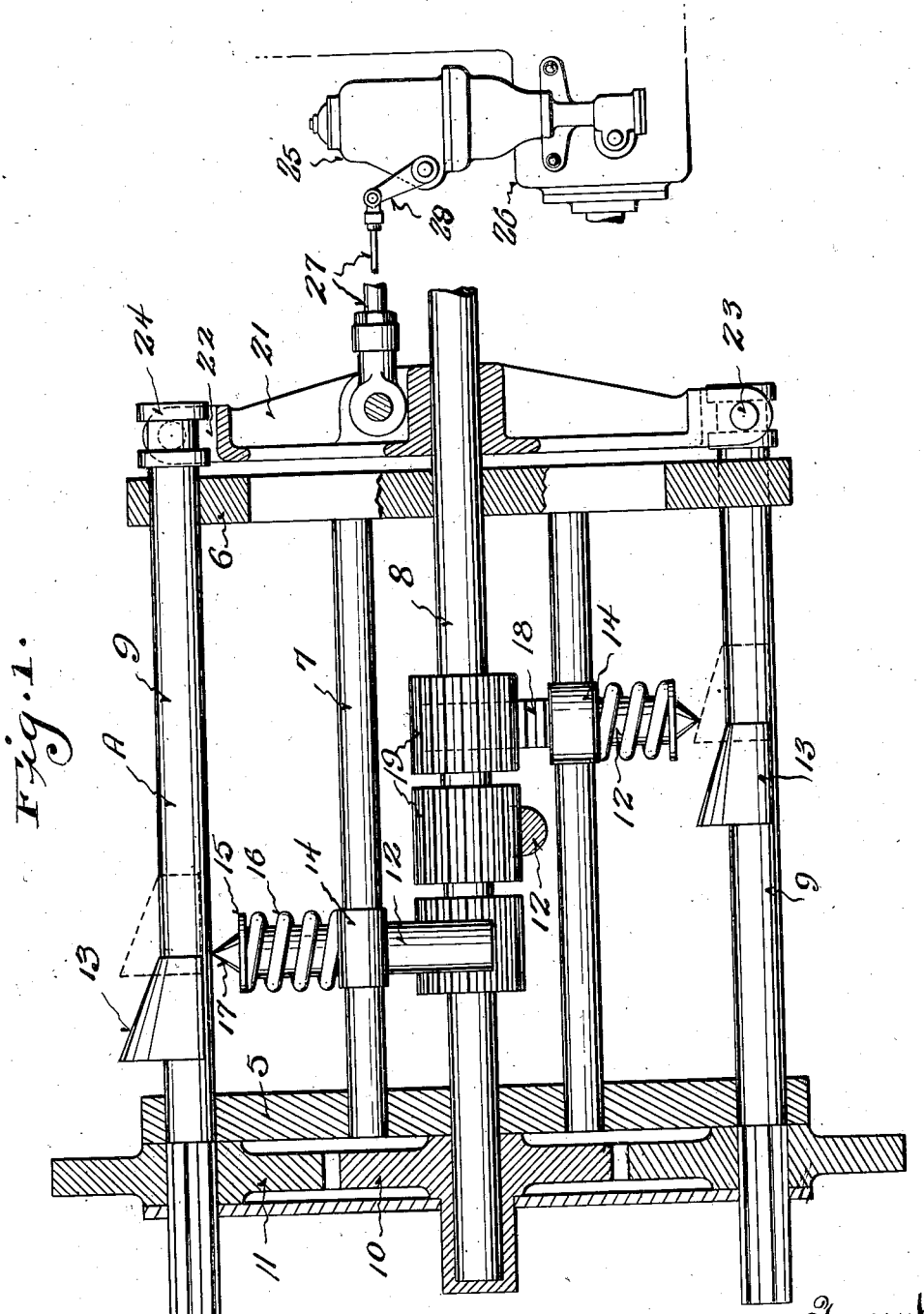
Figure 1 is a longitudinal section through the improved transmission, with the driving engine and control governor shown diagrammatically.
Figure 2:
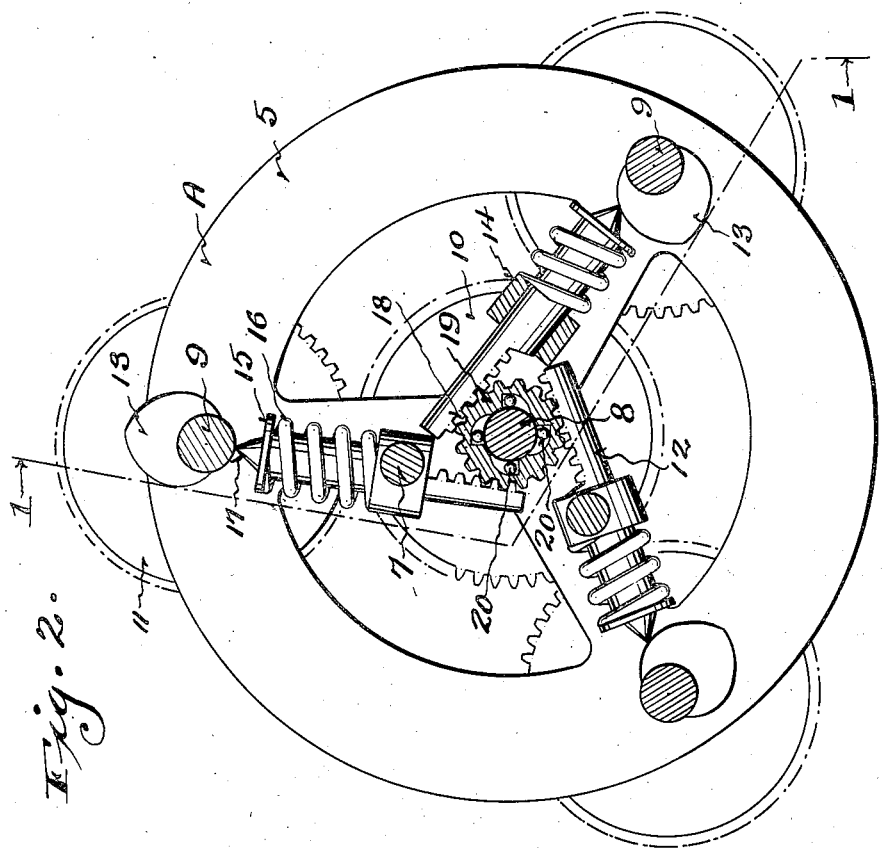
Figure 2 is a transverse section through the improved transmission.

Referring to the drawings in detail, wherein similar reference characters designate corresponding parts throughout the several views, the letter A generally indicates the power transmission, which may include end frame plates 5 and 6. These frame plates 5 and 6 can be rigidly connected together by means of rods 7, which in the present instance are shown to be three in number.

Rotatably supported by the frame plates 5 and 6 in any preferred manner is the driven shaft 8, and this shaft extends beyond the frame plate 6 and can be connected with the mechanism to be driven, such as the wheels of a motor vehicle.

Obviously, any desired type of anti-friction bearings can be provided for supporting the driven shaft, and the entire transmission can be encased within a suitable housing, if desired.

The rods 7 are grouped about the driven shaft 8 and are equidistantly spaced therefrom and are arranged at thirds thereabout. The plates 5 and 6 rotatably and slidably support cam shafts 9, which in the present instance are three in number, and these shafts are also grouped about and equidistantly spaced from the driven shaft.

Rotatable movement is imparted to the cam shafts 9 from the drive motor in any desired manner, and, as illustrated, a drive gear 10 is provided. The driven shaft 8 is piloted within the drive gear, and this gear has constantly meshing therewith spur gears 11, which are feathered on the cam shafts 9. The drive gear 10 is operatively connected to the drive motor in any desired way.

From the description so far, it can be seen that the cam shafts 9 can be slid longitudinally relative to their gears and still be driven thereby.

One of the main offices of the rods 7 is to slidably support the push rods 12, which are actuated by the cams 13 formed on or secured to the cam shafts 9. The rods 7 support guide collars, or sleeves, 14, and these collars, or sleeves, slidably receive the push rods 12.

These push rods are provided with stop washers 15 adjacent to their outer ends, and expansion coil springs 16 are placed around the push rods with their opposite ends bearing respectively against the washers 15 and the guide sleeves, or collars, 14. Thus, the push rods are normally urged toward the cam shafts 9 and their cams 13.

The extreme outer ends of the push rods can be provided with pointed bearing heads for engaging the cam shafts and cams. These pointed heads can be suitably treated to resist wear. The inner ends of the push rods are provided with rack bars 18, each of which meshes with a clutch gear 19.

The clutch gears 19 are mounted at spaced points on the driven shaft 8, and any suitable ratchet means can be provided for connecting the same with the driven shaft. In the present instance, the inner faces of the gears are provided with inclined seats for the reception of ball locks 20. Thus, when the gears 19 are rotated in one direction, the ball locks will be forced to the narrow ends of their seats and thus grip the shaft, and, when the gears are rotated in a retrograde direction, the balls will be forced to the enlarged ends of their seats and the gears will be permitted to rotate free of their shafts.

The cams being three in number are located at thirds, or 120 degrees, about the driven shaft and are so formed that the push rods 12 will be progressively actuated to permit a steady thrust to be imparted to the drive shaft.

Particular attention is invited to the manner in which the cams are generated, and it is to be noted that the cams occupy substanially two-thirds of the circumference of the shaft, that is, extend about their shafts for a distance of 240 degrees.

All of the cams gradually decrease in height from one end to the other, so that when the cam shafts are reciprocated the throw of the cams, relative to the push rods, is changed, so that the stroke of the push rods can be varied. The cams in end elevation follow somewhat the shape of a heart cam, but the same are so shaped that the movement of the push rods will be at a constant speed during the inward and outward traveling movement thereof.

In order to provide means for synchronously shifting the cam shafts 9 to vary the position of the cams relative to the push rods, a shift collar 21 is provided. This shift collar can be slidably and rotatably mounted on the driven shaft 8, and the same is provided at its periphery with forks 22, carrying bearing pins 23 for engaging shift collars 24 formed on said cam shafts.

While the shift collar 21 can be manually operated, it is one of the important objects of my invention to provide means for automatically shifting the collar in accordance with the speed of the engine, whereby the speed of the driven shaft can be varied in accordance with engine speed.

To accomplish the above, a governor 25 can be operated from the engine 26, and the collar 21 can be operatively connected to the governor through the medium of a link 27, connected respectively to the collar and the throw arm 28 of the governor.

In operation of my improved transmission, when the cams 13 and shafts 9 are in the position shown, no movement will be imparted to the push rods 12, as the same are merely riding on the shafts 9, and consequently the shaft 8 remains idle.

As the collar 21 is shifted to the right (Figure 1 of the drawings), the tapered ends of the cams 13 will be moved into engagement with the push rods, and, as these cams are driven from the drive gear 10, the same will reciprocate the push rods during their rotation.

Inward movement of the push rods will rotate the clutch gears 19, and thus bring about the rotation of the driven shaft 8. Obviously, on the outward movement of the push rods, the clutch gears will merely idle around the driven shaft.

As the clutch collar is shifted further and further to the right, the stroke of the push rods will gradually grow greater, and consequently the speed of the driven shaft will increase. By this construction and arrangement, I am enabled to provide a variable speed transmission having an infinite number of speed ratios.

Relative to the automatic feature of the transmission, as the speed of the engine increases, the shift collar will be moved outwardly, thus increasing the stroke of the push rods. As the speed of the engine decreases, the shift collar will be automatically pushed inwardly, and thus the stroke of the push rods will be decreased.

By this construction, I am enabled to entirely eliminate the necessity of providing manually operable members to obtain different speeds in motor vehicles, and the transmission will respond directly to the speed of the engine.

Changes in details may be made without departing from the spirit or the scope of this invention, but what I claim as new is:—

In a variable speed transmission, a driven shaft, a plurality of pinions rotatably mounted on said shaft, clutch elements between the pinions and the shaft for cooperation therewith, whereby to rotate the shaft in one direction upon movement of said pinions in reverse directions, a plurality of push rods located at equi-distantly spaced points around the shaft having rack bars meshing with the pinions, a plurality of rotatable and slidable cam shafts located at spaced points around the driven shaft, a drive gear, means synchronously rotating the cam shafts from the drive gear, cams on said cam shafts, spring means normally urging the push rods toward the cams and the cam shafts, said cams having a uniform throw and tapered from one end toward the other, a shift collar slidably and rotatably mounted on the driven shaft having radially extending shift forks, collars on the cam shafts having annular grooves receiving the forks, and means for sliding the shift collar on the driven shaft, as and for the purpose specified.

HAROLD G. STEIN.